US008493033B2

(12) United States Patent
Banta et al.

(10) Patent No.: US 8,493,033 B2
(45) Date of Patent: *Jul. 23, 2013

(54) METHOD AND APPARATUS FOR BATTERY-BACKED POWER SUPPLY AND BATTERY CHARGING

(75) Inventors: Kevin D. Banta, Orem, UT (US); D. George Field, Pleasant Grove, UT (US); E. Carl Goodman, Bountiful, UT (US)

(73) Assignee: Won-Door Corporation, Salt Lake City, UT (US)

( * ) Notice: Subject to any disclaimer, the term of this patent is extended or adjusted under 35 U.S.C. 154(b) by 321 days.

This patent is subject to a terminal disclaimer.

(21) Appl. No.: 12/862,593

(22) Filed: Aug. 24, 2010

(65) Prior Publication Data

US 2011/0036513 A1  Feb. 17, 2011

Related U.S. Application Data

(60) Continuation-in-part of application No. 12/631,182, filed on Dec. 4, 2009, now Pat. No. 7,782,019, which is a division of application No. 11/699,729, filed on Jan. 30, 2007, now Pat. No. 7,656,129.

(51) Int. Cl.
*H02J 7/04* (2006.01)
*H02J 7/16* (2006.01)

(52) U.S. Cl.
USPC .......................................... 320/141; 320/137

(58) Field of Classification Search
USPC .......................................................... 320/141
See application file for complete search history.

(56) References Cited

U.S. PATENT DOCUMENTS

| | | | |
|---|---|---|---|
| 3,823,358 A | 7/1974 | Rey | |
| 5,247,205 A | 9/1993 | Mototani | |
| 5,557,887 A | 9/1996 | Fellows et al. | |
| 5,594,316 A | 1/1997 | Hayashida et al. | |
| 5,659,208 A | 8/1997 | Kimble et al. | |
| 5,723,970 A * | 3/1998 | Bell | 320/140 |
| 5,734,237 A | 3/1998 | Engel et al. | |
| 6,157,168 A | 12/2000 | Malik | |
| 6,160,379 A | 12/2000 | Chalasani et al. | |
| 6,329,796 B1 * | 12/2001 | Popescu | 320/134 |
| 6,337,563 B2 * | 1/2002 | Takimoto et al. | 323/284 |
| 6,404,163 B1 | 6/2002 | Kapsokavathis et al. | |
| 6,452,364 B1 * | 9/2002 | Saeki et al. | 320/137 |
| 6,459,175 B1 | 10/2002 | Potega | |
| 6,522,099 B2 | 2/2003 | Tominaga et al. | |
| 6,533,074 B2 | 3/2003 | Tominaga et al. | |
| 6,765,363 B2 * | 7/2004 | LaFollette et al. | 320/107 |
| 6,809,501 B2 | 10/2004 | Kapsokavathis et al. | |
| 6,936,995 B2 | 8/2005 | Kapsokavathis et al. | |
| 6,943,531 B2 | 9/2005 | Fukaya | |
| 6,977,485 B1 * | 12/2005 | Wei | 320/139 |
| 7,066,297 B2 | 6/2006 | Goodman et al. | |
| 7,157,806 B2 | 1/2007 | Jabaji et al. | |
| 7,202,634 B2 * | 4/2007 | Bucur | 320/137 |
| 7,656,129 B2 | 2/2010 | Banta et al. | |
| 7,782,019 B2 | 8/2010 | Banta et al. | |
| 2002/0126431 A1 | 9/2002 | Yanagisawa | |
| 2003/0102845 A1 | 6/2003 | Aker et al. | |
| 2005/0077878 A1 | 4/2005 | Carrier et al. | |

FOREIGN PATENT DOCUMENTS

| | | |
|---|---|---|
| DE | 9203945.5 | 5/1992 |
| EP | 1484664 A2 | 12/2004 |
| WO | 2006127143 A1 | 11/2006 |

OTHER PUBLICATIONS

PCT International Search Report for International Application No. PCT/US2008/051136, mailed Dec. 22, 2008.
Notebook PC Battery Charge Controller and Selector with DPM, <http://focus.ti.com/lit/ds/symlink/bq24700.pdf>, retrieved Nov. 2002.
PCT International Preliminary Report on Patentability and Written Opinion for International Application No. PCT/US2008/051136, mailed Aug. 4, 2009 (28 pages).

* cited by examiner

*Primary Examiner* — Arun Williams
(74) *Attorney, Agent, or Firm* — TraskBritt

(57) ABSTRACT

Apparatuses, systems, and methods for providing battery-backed power to movable partitions are disclosed. A power converter generates a DC output from an AC input. The DC output may be selectively decoupled from an enabled DC output such that the DC output can be monitored for acceptable operation in-situ. The enabled DC output may be selectively coupled to a battery output terminal. A charge current may be sensed between the enabled DC output and the battery output to control charging of the battery with a pulse-width modulation operation by controlling the selective coupling of the enabled DC output to the battery output. The enabled DC output and the battery output are coupled in a logical-OR configuration to generate a supply output providing current from the enabled DC output and the battery. The supply output may drive a movable partition controller and a motor configured for opening and closing a movable partition.

21 Claims, 7 Drawing Sheets

METHOD AND APPARATUS FOR BATTERY-BACKED POWER SUPPLY AND BATTERY CHARGING

CROSS-REFERENCE TO RELATED APPLICATIONS

This application is a continuation-in-part of U.S. patent application Ser. No. 12/631,182, filed Dec. 4, 2009, now U. S. Pat. No. 7,782,019, issued Aug. 24, 2010, which application is a divisional of U.S. patent application Ser. No. 11/699,729, filed Jan. 30, 2007, now U.S. Pat. No. 7,656,129, issued Feb. 2, 2010, the disclosure of each of which is hereby incorporated herein by this reference in its entirety.

BACKGROUND OF THE INVENTION

1. Field of the Invention

The present invention relates generally to direct current power supplies for driving large current loads and more specifically to power supplies including a battery backup that can be charged.

2. State of the Art

Automatic doors are implemented in various configurations such as, for example, sliding doors, rotating panel doors, folding doors, and revolving doors. Automatic doors are often relied on for security and fire safety purposes. For example, an automatic door system including one or more accordion-type doors may be used as a security and/or a fire door. These automatic doors are configured to open or close automatically dependent on a trigger such as a security or fire indicator. As a result, the automatic doors include control electronics and one or more motors to control movement of the door. This motor and accompanying control electronics must be driven by a power supply. Many automatic doors include a conventional power supply coupled to a traditional Alternating Current (AC) power source that converts the AC supply to a Direct Current (DC) supply suitable for use by the motor and control electronics.

However, in many emergency situations, a reliable AC power source may not be available. To provide reliable power, many automatic doors include a conventional AC/DC converter power supply coupled with a battery backup that switches in when the AC power source is compromised. Furthermore, in some cases, the power source for the automatic door may include a battery charger for maintaining the battery at a full charge via AC/DC converter power supply.

A need exists to provide a more reliable and efficient power source that can provide power from a conventional AC source as well as a battery backup to provide power for a motor and accompanying control electronics of an automatic door.

BRIEF SUMMARY OF THE INVENTION

The present invention provides apparatuses and methods for providing battery charging and contemporaneous battery-backed power useful in controlling and motivating automatic doors. The present invention also provides apparatuses and methods for providing efficient in-situ charging of the battery as well as efficient in-situ testing of an AC/DC power converter.

An embodiment of the present invention is a method of providing battery-backed power. The method includes providing a power converter for generating a DC output from an AC input. The DC output may be selectively decoupled from an enabled DC output such that the DC output can be monitored for acceptable operation in-situ. The enabled DC output may be selectively coupled to a battery output terminal of a battery. The method also includes sensing a charge current between the enabled DC output and the battery output to control charging of the battery with a pulse-width modulation operation by controlling the selective coupling of the enabled DC output to the battery output. The enabled DC output and the battery output are coupled in a logical-OR configuration to generate a supply output that provides current from the enabled DC output when it is enabled as well as from the battery.

In another embodiment of the present invention, a battery-backed power supply includes a power converter with an AC input and a DC output. A first diode is operably coupled in a forward biased configuration between the DC output and a biased DC output. A supply switch is configured for selectively coupling the biased DC output to a supply output such that the DC output can be monitored for acceptable power converter operation in-situ. A battery switch is configured for selectively coupling the supply output to a battery-charge signal and a battery is operably coupled between a ground and a battery output. A current sensor is operably coupled in series between the battery-charge signal and the battery output. A second diode is operably coupled between the battery output and the supply output. A controller is configured for charging the battery by controlling the battery switch with a pulse-width modulation operation and configured for controlling the supply switch to cause the selective coupling between the biased DC output and the supply output.

In another embodiment of the present invention, a movable partition system includes the battery-backed power supply and a movable partition controller operably coupled to the supply output and including a motor configured for opening and closing a movable partition. The movable partition system may include additional components depending, for example, on the intended application of the motor. For example, in one embodiment the motor may be operably coupled to a portion of a movable partition in order to deploy and retract or otherwise displace the partition. Such a partition may include, for example, a folding or accordion-style door having a plurality of hingedly coupled panels. The partition may be configured as a fire barrier in one particular example. Of course, the system may include other components and be configured for other applications as will be appreciated by those of ordinary skill in the art.

BRIEF DESCRIPTION OF THE SEVERAL VIEWS OF THE DRAWINGS

In the drawings, which illustrate embodiments of the invention.

DETAILED DESCRIPTION OF THE INVENTION

The present invention provides apparatuses and methods for providing battery charging and contemporaneous battery-backed power useful in controlling and motivating automatic doors. The present invention also provides apparatuses and methods for providing efficient in-situ charging of the battery as well as efficient in-situ testing of an AC/DC power converter.

In the following description, circuits and functions may be shown in block diagram form in order not to obscure the present invention in unnecessary detail. Conversely, specific circuit implementations shown and described are only examples and should not be construed as the only way to implement the present invention unless specified otherwise herein. For the most part, details concerning timing considerations, and the like, have been omitted inasmuch as such details are not necessary to obtain a complete understanding of the present invention and are within the ability of persons of ordinary skill in the relevant art.

Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Figure 1:
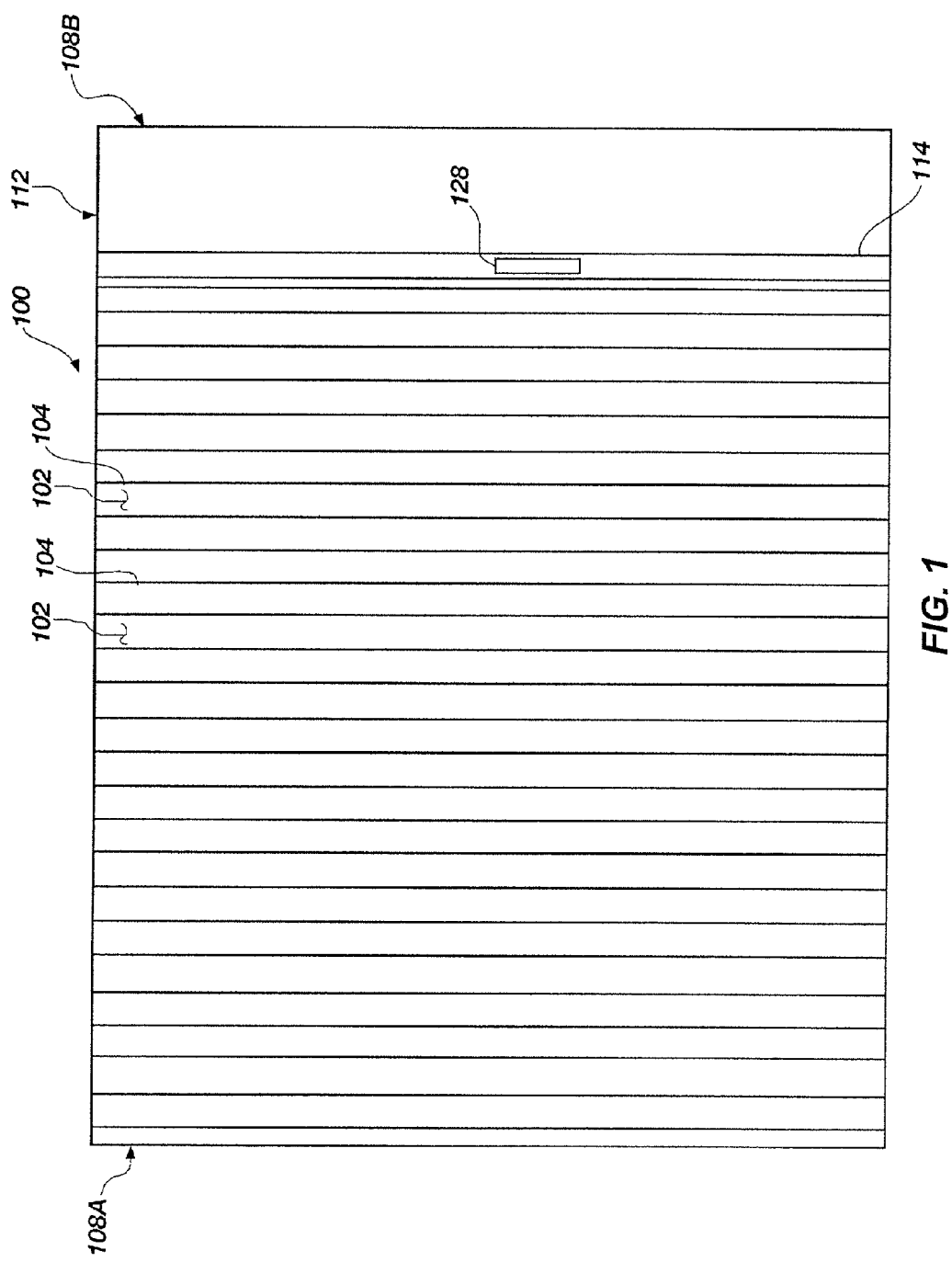
FIG. 1 is an elevation view of a movable partition in accordance with one embodiment of the present invention.
Figure 2:
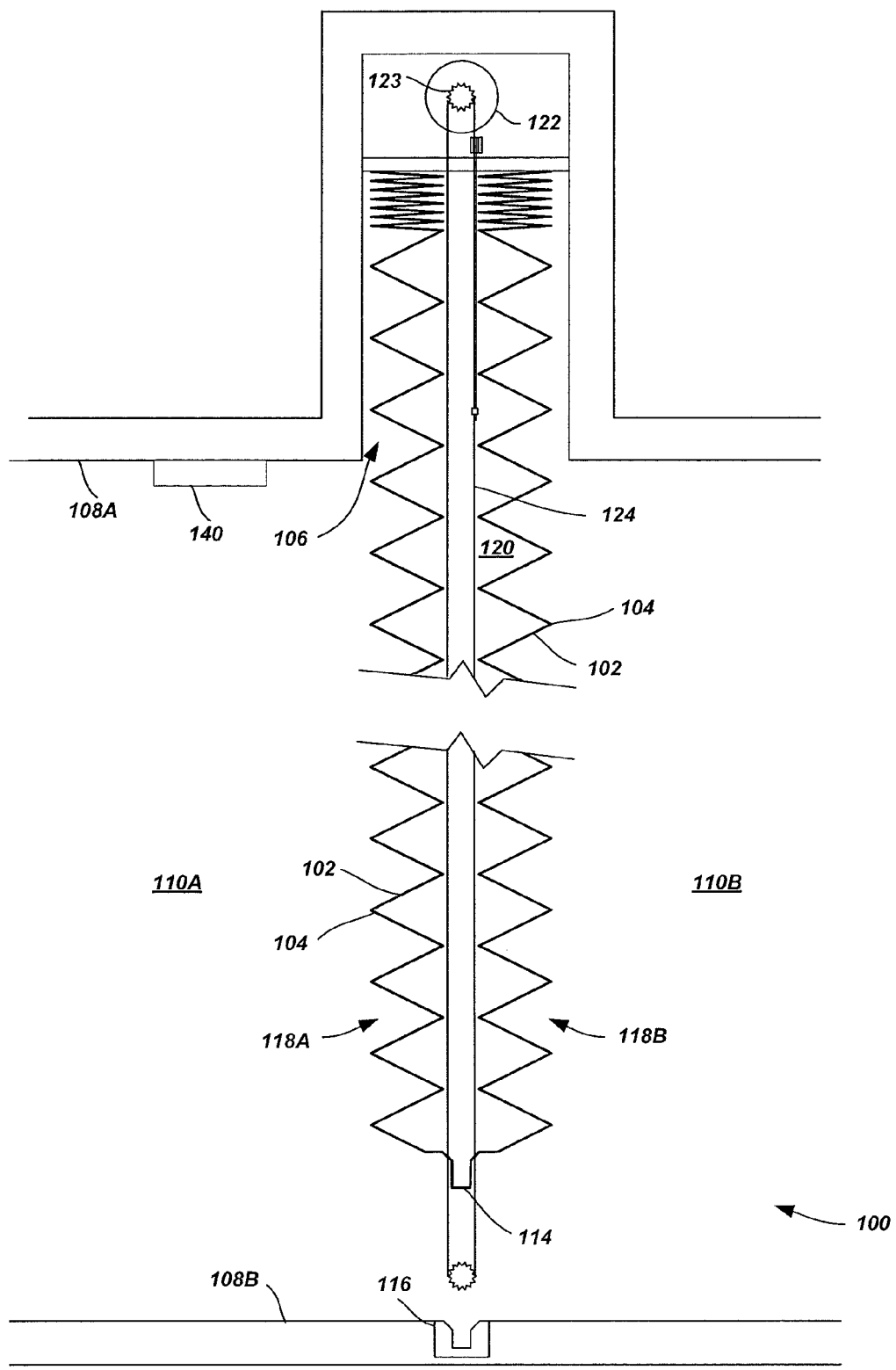
FIG. 2 is a plan view of the movable partition shown in FIG. 1.
Figure 3:
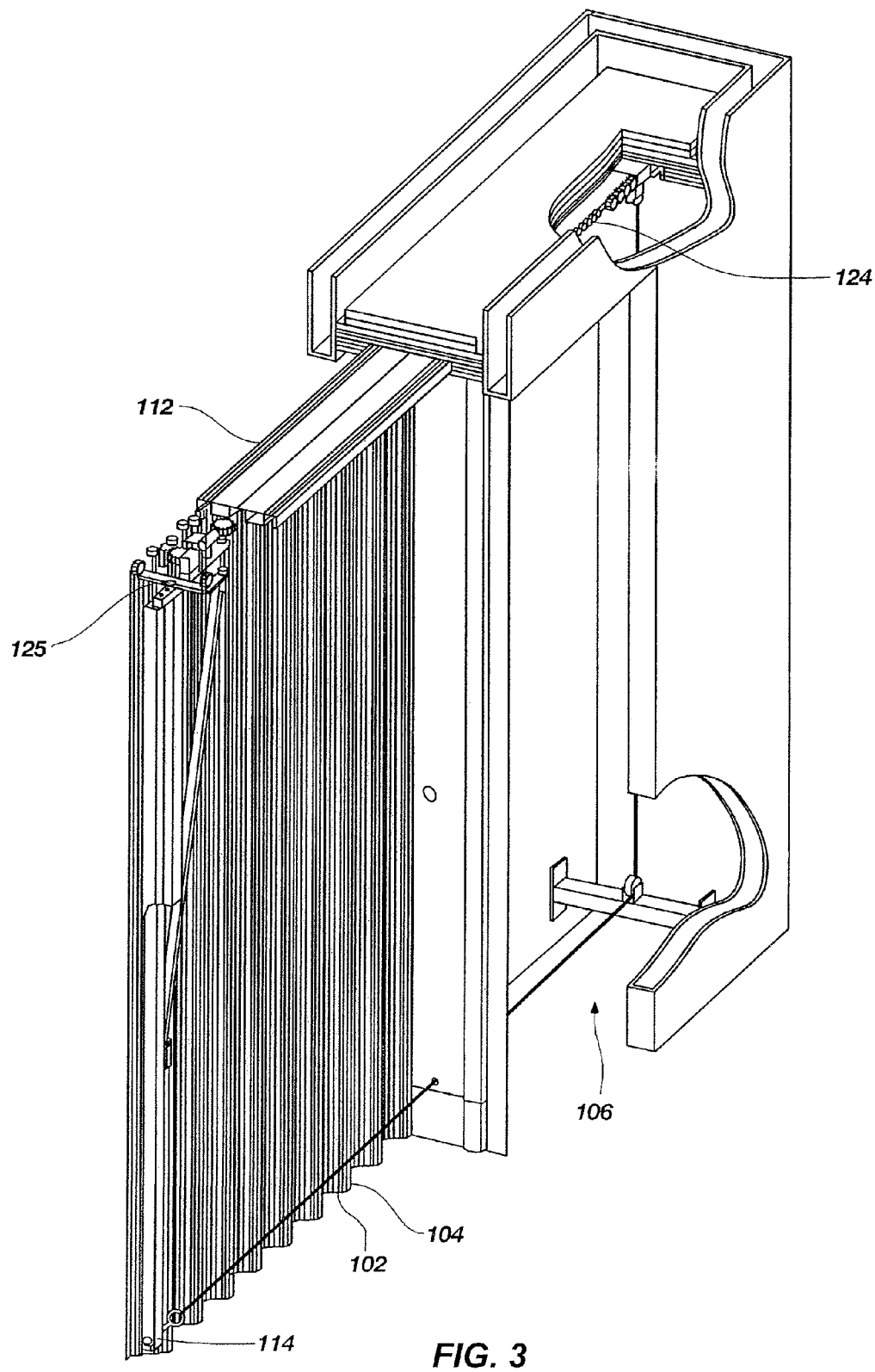
FIG. 3 is a perspective view of a movable partition shown in FIGS. 1 and 2.

Referring to FIGS. 1 through 3, an elevation view, a plan view and a perspective view are shown, respectively, of a movable partition 100. It is noted that, in FIG. 3, various portions of certain structures or components are partially sectioned for sake of clarity and simplicity in showing various aspects of the described embodiment. In the example shown in FIGS. 1 through 3, the movable partition 100 may be in the form of folding door. In certain embodiments, the partition 100 may be used, for example, as a security door, a fire door or as both. In other embodiments, the partition need not be utilized as a fire or security door, but may be used simply for the subdividing of a larger space into smaller rooms or areas.

The partition 100 may be formed with a plurality of panels 102 that are connected to one another with hinges or other hinge-like structures 104 in an alternating pattern of panels 102 and hinge structures 104. The hinged connection of the individual panels 102 enables the panels 102 to fold relative to each other in an accordion or a plicated manner such that the partition 100 may be compactly stored, such as in a pocket 106 formed in a first wall 108A of a building when the partition 100 is in a retracted or folded state.

When in a deployed state, the partition 100 may extend from the first wall 108A to a second wall 108B to act as a barrier (e.g., a fire or security barrier) or to divide one area or room into multiple rooms 110A and 110B. When it is desired to deploy the partition 100 from a stowed condition to an extended position, for example to secure an area during a fire, the partition 100 may be motivated along an overhead track 112 (see FIG. 3) across the space to provide an appropriate barrier. When in a deployed or an extended state, a leading edge of the partition 100, shown as a male lead post 114, may complementarily or matingly engage with a jamb or door post 116 that may be formed in the second wall 108B of a building.

As best seen in FIG. 2, the partition 100 may include a first barrier or structure 118A and a second barrier or structure 118B, each including a plurality of panels 102 coupled with one another by way of hinges or hinge-like structures 104. The second structure 118B is laterally spaced from the first structure 118A. Such a configuration may be utilized as a fire door wherein one structure (e.g., structure 118A) acts as a primary fire and smoke barrier, the space 120 between the two structures 118A and 118B acts as an insulator or a buffer zone, and the another structure (e.g., structure 118B) acts as a secondary fire and smoke barrier. Such a configuration may also be useful in providing an acoustical barrier when the partition is used to subdivide a larger space into multiple, smaller rooms.

Various means may be used to displace the partition 100 from a stowed condition to a deployed condition and vice versa. In one embodiment, an appropriate actuator may be used to displace the partition 100. For example, a drive may include a motor 122 coupled to a pulley or gear 123 configured to drive a transmission member such as a belt or chain 124.

A portion of the belt or chain 124 may be coupled to a trolley 125 (see FIG. 3) that is configured to ride along the track 112. The trolley 125 may be coupled to a component of the partition 100 such as, for example, the lead post 114. Thus, actuation of the motor 122 and belt or chain 124 in a first direction results in displacement of the trolley 125 and lead post 114 so that the partition may be deployed. Actuation of the motor 122 and belt or chain 124 in a second direction results in displacement of the trolley 125 and lead post 114 so that the partition may be retracted.

Additionally, various sensors, switches, and control electronics may be employed in association with such a drive to assist in the control of the partition 100. These electronic components may be generally and collectively referred to as a movable partition controller 140. While shown as a box on the first wall 108A, those of ordinary skill in the art will recognize that the sensors, switches and other electronic components may be distributed at various locations in and around the movable partition 100. As an example of control electronics, as shown in FIG. 1 and when used as a fire door, the partition 100 may include a switch or actuator 128, commonly referred to as "panic hardware." Actuation of the actuator 128 allows a person located on one side of the partition 100 (e.g., in room 110A) to cause the partition 100 to open if it is closed, or to stop while it is closing, so as to provide access through the barrier formed by the partition 100 for a predetermined amount of time.

It is noted that, while the above description has been more directed to an embodiment including a single partition 100 extending from the first wall 108A to the second wall 108B, other movable partitions may be utilized. For example, a two-door, or bi-part partition configuration may be utilized wherein two similarly configured partitions extend across a space and join together to form an appropriate barrier as will be appreciated by those of ordinary skill in the art.

The motor 122 and movable partition controller 140 need electric power to operate. This electrical power is provided by a power supply, which may be placed locally, for example, perhaps at a location within the pocket 106. Alternatively, the power supply may be placed remotely from the movable partition 100 with power lines running from a battery-backed power supply to the motor 122 and movable partition controller 140.

Figure 4:
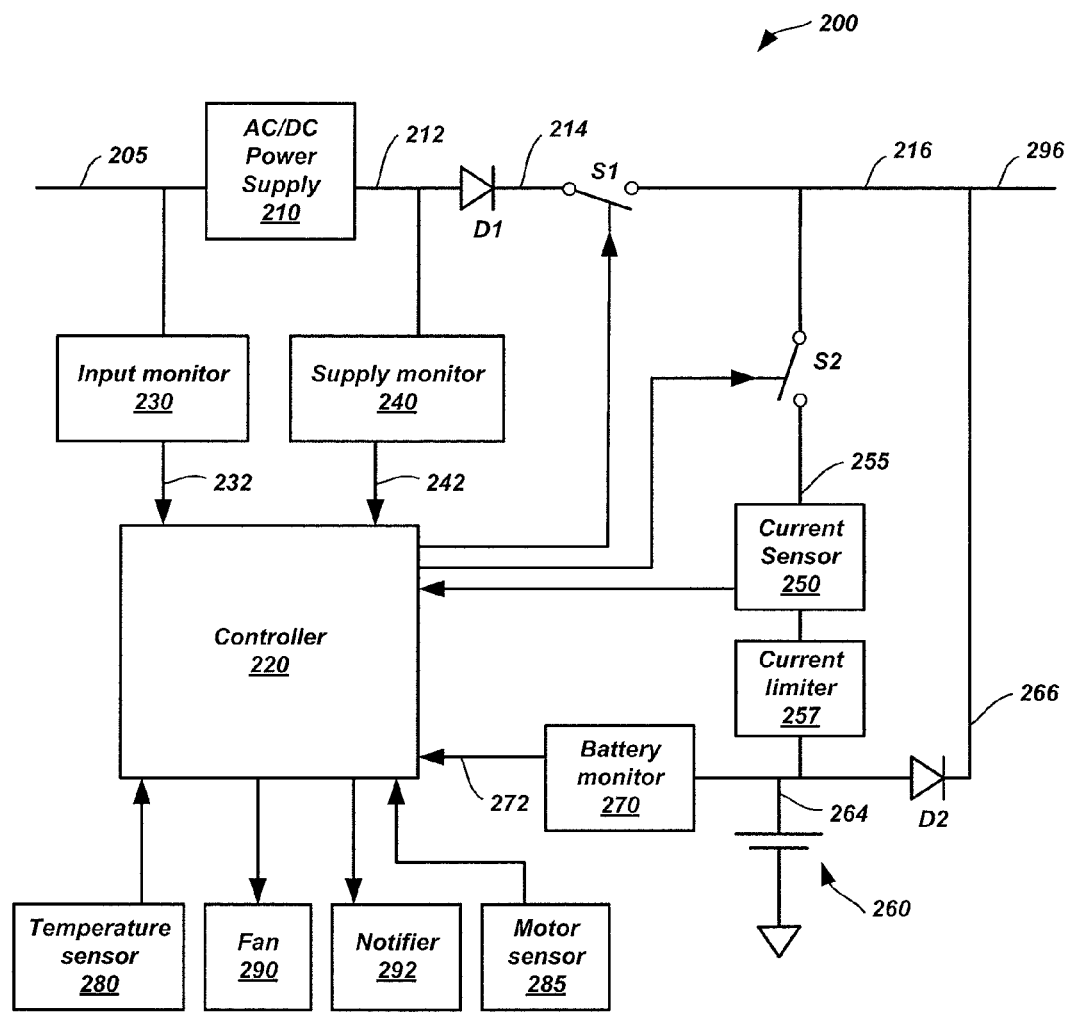
FIG. 4 is a block diagram of battery-backed power supply according to an embodiment of the present invention.

FIG. 4 is a block diagram of a battery-backed power supply 200 according to an embodiment of the present invention. The battery-backed power supply 200 includes a power converter 210 with an alternating current (AC) input 205 and a direct current (DC) output 212. A battery 260 is included and connected between a ground and a battery output 264. The battery 260 is configured for supplying current to a supply output 296 when the power converter 210 is removed, un-operational, or fails to supply a sufficient voltage level.

The power converter 210 may be any suitable AC to DC power supply, such as, for example, a conventional switching power supply. The AC input 205 may generally be a conventional 60 Hz nominal 115-volt AC power signal. As examples only, and not limitations, the DC output 212 may be a relatively high current output with a voltage such as about 15 volts or about 28 volts suitable for providing power to a 12-volt or 24-volt DC motor in the movable partition system.

The battery 260 may be any battery suitable for delivering a relatively high current suitable for driving the motor 122 of the movable partition system. By way of example, and not limitation, suitable batteries may include lead-acid batteries and valve regulated lead-acid batteries such as gel-cell batteries and absorbent glass mat batteries. Of course, while represented as a single battery, those of ordinary skill in the art will recognize that the battery 260 may be configured as multiple batteries coupled in series, parallel, or combinations thereof, to generate the appropriate voltage and current levels.

A first diode D1 is connected to the DC output 212 in a forward biased direction between the DC output 212 and a biased DC output 214. Similarly, a second diode D2 is connected to the battery output 264 in a forward biased direction between the battery output 264 and a biased battery output 266. A supply switch S1 is connected in series between the biased DC output 214 and an enabled DC output 216. As a result, when the supply switch S1 is closed, the biased DC output 214 and the biased battery output 266 are coupled together to drive the supply output 296 in a logical-OR configuration. Unlike many conventional battery-backed power supplies, this configuration eliminates the need for a transfer switch for selecting between a power supply output and a battery output. With the wired-OR configuration, the diodes (D1 and D2) prevent reverse bias current to the battery 260 or power converter 210 and enable current to be delivered from a combination of the battery 260 and the power converter 210. Of course, if the battery 260 is low on charge, the battery voltage may be low so that most or all of the current to the supply output 296 is provided by the power converter 210. Similarly, if the power converter 210 is missing, supplying inadequate voltage, or the supply switch S1 is open, most or all of the current to the supply output 296 is provided by the battery 260. In addition, this configuration creates a dual source from which to pull current in a heavy load condition.

The battery 260 may be charged through a combination of a controller 220 sampling a current sensor 250 and controlling a battery switch S2. The current sensor 250 and the battery switch S2 are connected in series between the enabled DC output 216 and the battery output 264. When the battery switch S2 is closed, a battery-charge signal 255 is generated that is of a suitable voltage and current level for charging the battery 260. Operation of the battery charging process will be explained more fully below with respect to the discussion of FIG. 5.

The controller 220 may be any suitable processor, microcontroller, Field Programmable Gate Array (FPGA), or other suitable programmable device configured for controlling and sampling the various signal connected thereto and generally controlling operation of the battery-backed power supply 200 and the battery charging process. By way of example only, and not limitation, a PIC 18F2220 microcontroller from Microchip Technology Inc. may be used. The controller 220 may be referred to herein as a controller, processor, or microcontroller.

The current sensor 250 may be a Hall effect current sensor, ammeter, or other current sensor suitable for generating an analog or digital signal wherein the signal is proportional to the amount of current flowing through the current sensor 250. In some embodiments, a Hall effect current sensor may be used to minimize or substantially eliminate any voltage drop that may occur across the current sensor 250. Current sensors 250 configured to generate an analog signal may be coupled to an analog-to-digital input of the microcontroller 220 to sample the input and convert it to a digital value suitable for use by software on the microcontroller 220. Current sensors 250 that generate a digital signal may directly interface to a serial or parallel port on the microcontroller 220 to present a digital value suitable for use by software on the microcontroller 220.

A current limiter 257 may also be connected in this series path to limit the amount of current flowing between the enabled DC output 216 and the battery output. The current limiter 257 may be, for example, a positive temperature coefficient (PTC) device. The PTC device operates such that it heats up as the amount of current flowing through it increases. At a predefined temperature threshold, the impedance of the PTC device increases to limit the amount of current flowing therethrough. When the PTC device cools, it returns to the lower impedance state allowing more current to flow therethrough. Thus, the current limiter 257 can protect the current sensor 250 from high currents as well as protecting the battery from excessive current that may cause problems during the charging process.

Embodiments of the present invention include mechanisms for determining the presence and operation of the power converter 210. An input monitor 230 may be used for determining that an adequate AC input 205 is being supplied to the power converter 210. A supply monitor 240 may be used to determine that an acceptable DC output 212 is being generated by the power converter 210. In simple forms, the input monitor 230 and supply monitor 240 may be configured as voltage dividers configured as a pair of resistors in series that generate an analog output voltage proportional to the input voltage. The voltage divider can reduce the voltage of its input signal to a voltage that is appropriate for connection to an analog-to-digital converter input on the microcontroller 220. Thus, the microcontroller 220 can periodically sample an input voltage signal 232 from the input monitor 230 to determine that an appropriate AC input 205 is being provided. Similarly, the microcontroller 220 can sample a supply voltage signal 242 from the supply monitor 240 to determine that an acceptable DC output 212 is being generated. Operation of the DC output 212 detection is described more fully below in the discussion of FIG. 6. Of course, those of ordinary skill in the art will recognize that other voltage monitors may be used for the input monitor 230 and supply monitor 240. By way of example, and not limitation, one or more of the monitors may be configured as an analog-to-digital converter that samples an analog signal and presents the input voltage signal 232 and supply voltage signal 242 as digital inputs representing a voltage level.

A battery monitor 270 is connected to the battery output 264 to monitor voltage of the battery output 264. Similar to the input monitor 230 and supply monitor 240, the battery monitor 270 may be a simple voltage divider presenting a battery voltage signal 272 as an analog voltage to the microcontroller 220. Alternatively, the battery monitor 270 may be another suitable device for presenting to the microcontroller 220 the battery voltage signal 272 as a parallel or serial digital signal that is proportional to the voltage of the battery output 264.

The battery-backed power supply 200 may also include a temperature sensor 280, a fan 290, and a notification element 292. The temperature sensor 280 may be positioned substantially near the power converter 210 to monitor temperature of the power converter 210. Thus, as is explained more fully below during the discussion of FIG. 6, the microcontroller 220 may control operation of the fan 290, or cause other suitable events to happen, if the temperature gets too high. The notification element 292 may be operated by the microcontroller 220 to notify a user of certain events of interest that may occur during operation of the battery-backed power supply 200. By way of example, and not limitation, the notification element 292 may be an element such as a speaker, a light emitting diode (LED), a liquid crystal display (LCD) or other suitable element to notify a user of the status of the system. The controller 220 may control the motor 122 (FIG. 2). Alternatively, the system may include a separate controller for the motor 122. The battery-backed power supply 200 may also include a motor sensor 285 for determining when current is being supplied to the motor 122, when the motor 122 is rotating, or a combination thereof. Thus, the controller 220 may determine when the motor is operating based on information sampled from the motor sensor 285 or from determining the state of its own control signals to the motor 122, if so equipped.

Switches S1 and S2 are illustrated as simple controlled switches for ease of description. By way of example, and not limitation, these switches may be implemented as bipolar transistors, field effect transistors, relays, Micro Electro Mechanical System (MEMS) relays, or other suitable elements.

Figure 5:
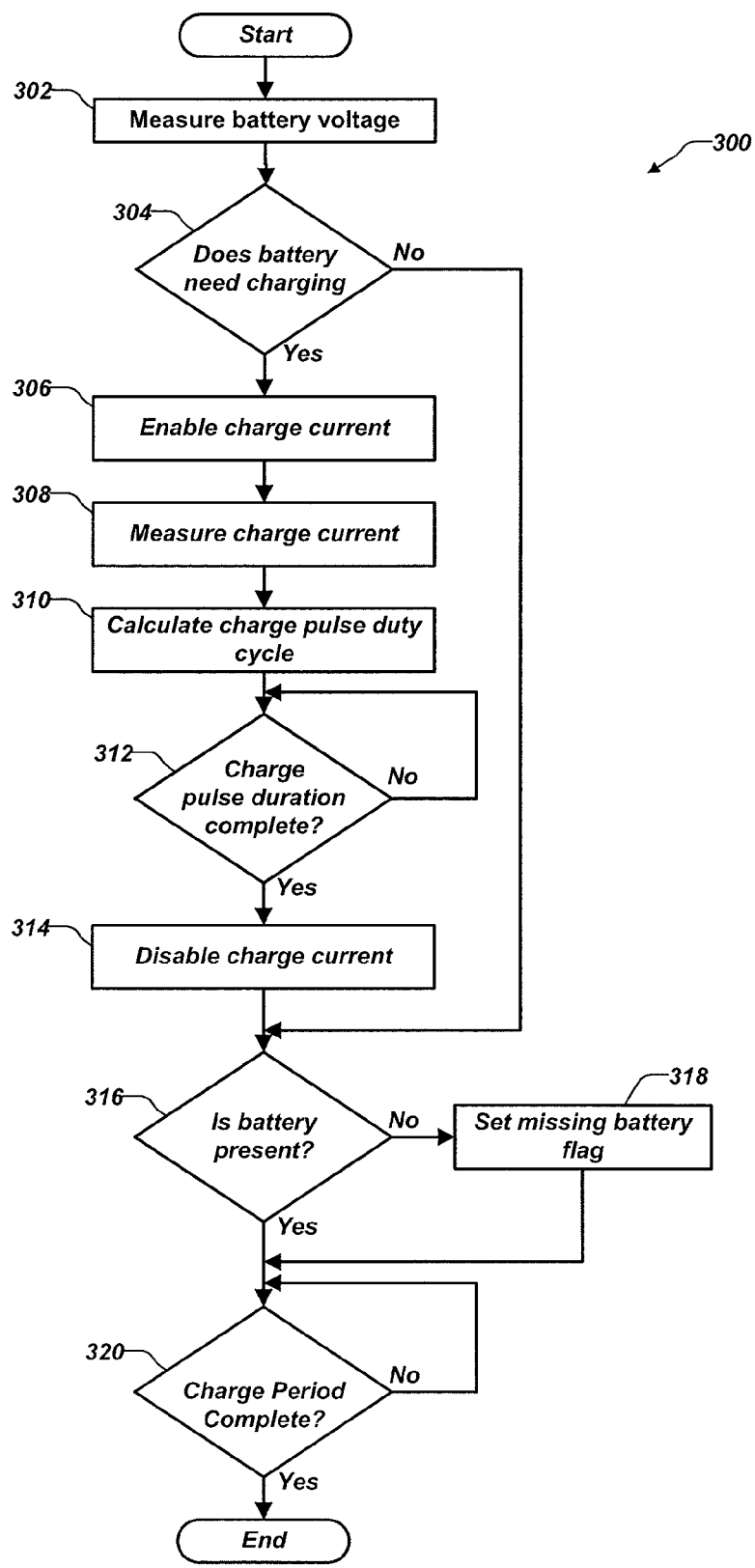
FIG. 5 is a flow diagram illustrating a pulse-width modulation operation for charging a battery according to an embodiment of the present invention.
Figure 6:
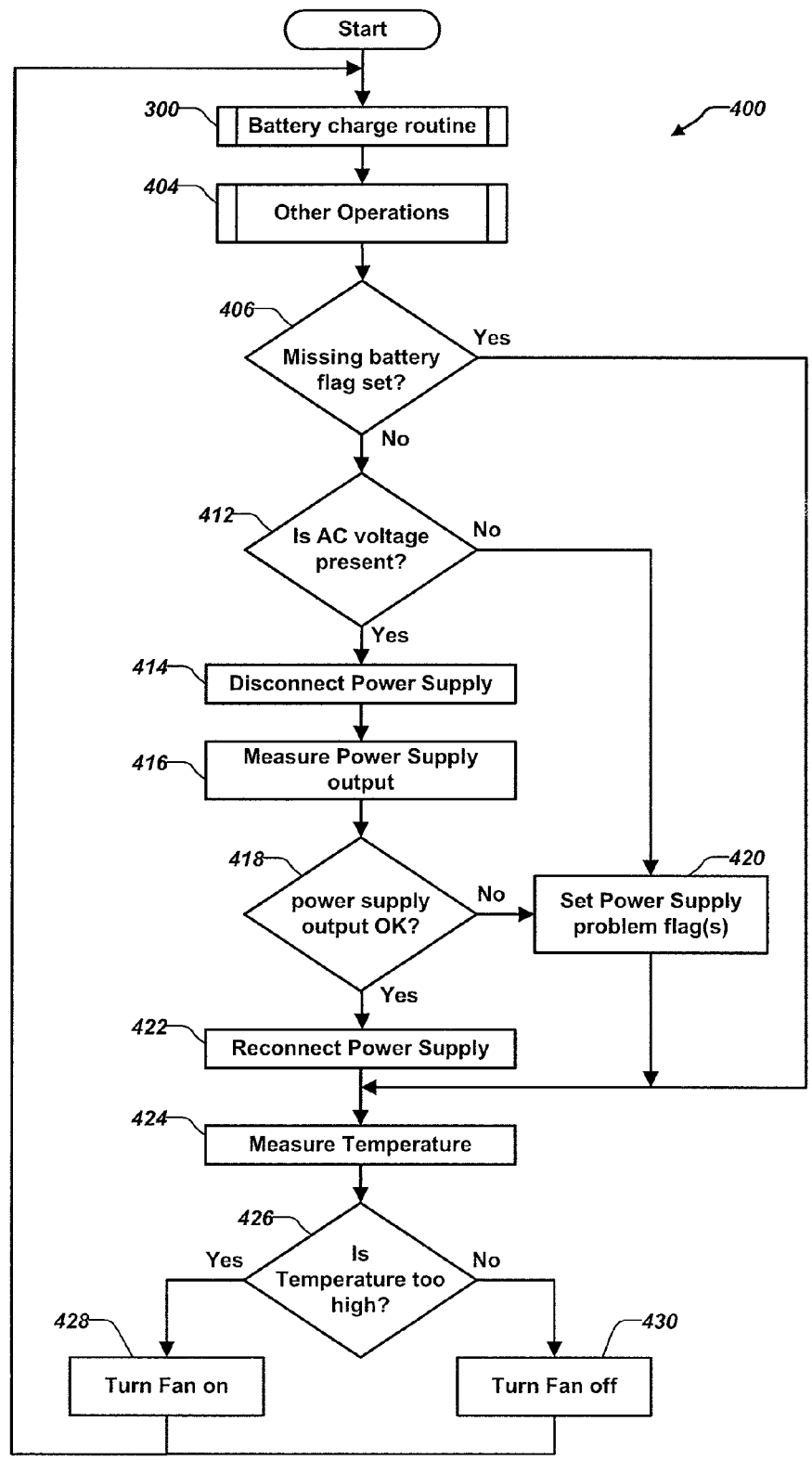
FIG. 6 is a flow diagram illustrating an example of an overall flow for operating various aspects of the battery-backed power supply according to an embodiment of the present invention.

FIGS. 5 and 6 illustrate processes that may be carried out as computer executable instructions operating on the microcontroller 220. Unless specified otherwise, the order in which the processes are described is not intended to be construed as a limitation. Furthermore, the processes may be implemented in any suitable hardware, software, firmware, or combinations thereof. By way of example, instructions for executing the software processes may be stored on a storage device (not shown) and transferred to memory (not shown) coupled to the controller 220, or may be stored as firmware in a volatile or non-volatile fashion in memory on the microcontroller 220.

When executed as firmware or software, the instructions for performing the processes may be stored on a computer readable medium. A computer readable medium includes, but is not limited to, magnetic and optical storage devices such as disk drives, magnetic tape, CDs (compact disks), DVDs (digital versatile discs or digital video discs), and semiconductor elements such as RAM, DRAM, ROM, EPROM, and Flash memory.

FIG. 5 is a flow diagram illustrating a pulse-width modulation operation for charging a battery according to an embodiment of the present invention. The battery charging uses intelligent control to achieve favorable charging conditions by monitoring the charge current that the battery will accept and limiting the amount of time that the charge current is applied to the battery. By using a pulse-width modulated current, the battery charging operation generates a charge current that is as high as the battery will accept, but limits the average charge current integrated over time to no higher than the recommended charge current for the battery being charged.

In describing the battery charging operation 300, reference will be made to both FIGS. 4 and 5. In general, element numbers on FIG. 4 are in the format 2xx, while element numbers in FIG. 5 are in the format 3xx. The battery charging is achieved by setting the DC output 212 at a voltage sufficient to deliver a voltage to the battery output 264 that is at least as high as the float charge voltage of the battery 260. The float charge voltage is generally a voltage that is high enough to sustain a charging current through the battery's internal resistance. Thus, the DC output 212 should be at a voltage sufficiently high when taking into account voltage drops that may occur across the first diode D1, the supply switch S1, the battery switch S2, the current sensor 250, and, if present, the current limiter 257.

Furthermore, embodiments of the present invention use pulse width modulation (PWM) to charge the battery 260. With PWM the power converter 210 can supply as much current as the battery 260 will accept for a portion of a charging period, then supply no current to the battery 260 for the balance of the charging period. As a result, the system may charge the battery 260 in a very efficient, but still safe, manner by determining the average current over the charging period and ensuring that the average current is substantially near the maximum recommended charge current for the battery 260 being charged.

The battery charging operation 300 may be implemented as a timed event that occurs on a periodic basis such as, for example, within a timed software loop or at the occurrence of a timed event. To begin the operation, process block 302 indicates that the battery voltage is measured, which is performed by the microcontroller 220 reading the battery voltage signal 272 generated by the battery monitor's 270 representation of the voltage of the battery output 264.

Decision block 304 tests to see if the battery 260 needs charging. This test includes determining if the voltage of the battery output 264 is lower than the float charge voltage of the battery 260 to be charged. If not, control passes down to decision block 316.

If the battery 260 needs charging, operation block 306 enables the charge current, which is done by controlling a signal to close the battery switch S2. At a small time delay after the charge current is enabled, operation block 308 measures the charge current. The charge current is measured by the controller 220 sampling a signal from the current sensor 250, which gives an indication of the magnitude of current that the battery 260 is accepting.

Operation block 310 calculates the charge pulse duty cycle that should be applied to the battery 260. In other words, a cycle time for a charging period is determined. By way of example, and not limitation, this charging period may be defined as 6.6 milliseconds. Based on the battery in the system, the battery will have a recommended maximum charge rate, which may be generally expressed in Amp-Hours. Generally, the recommended maximum charge rate is expressed as a percentage of the rating of the battery, such as, for example, 0.2*C, where C is the battery rating in Amp-Hours. Thus, if the battery is rated for 18 Amp-Hours, the average charge rate should be held near or below 3.6 Amp-Hours. By using pulse width modulation, a large current is applied for a portion of the charging period and no current is applied for the balance of the charging period such that the time averaged current is near or below the maximum charge current rating of the battery 260.

With the charge pulse-width duty cycle determined, a charge pulse duration is determined and decision block 312 waits for the charge pulse duration to expire. This duration may be implemented, for example, as a software loop or a timer.

When the charge pulse duration is complete, operation block 314 disables the charge current, which is done by controlling a signal to open the battery switch S2.

Decision block 316 tests to see if a battery is actually present in the system, which is accomplished by the controller 220 sampling the battery voltage signal 272 which should indicate a voltage of substantially near zero when there is no battery present. If there is no battery present, operation block 318 sets a flag indicating that a battery is missing. This flag may be used by other software routines operating on the microcontroller 220. Of course, the operation of testing for a battery present may be performed before or after the charging operations. Furthermore, those of ordinary skill in the art will recognize that the operations may be configured such that the battery charging operation 300 including blocks 306, 308, 310, 312, and 314, may be performed when the battery 260 is present or when the battery 260 is not present.

Decision block 320 indicates a loop that waits for the duration of the charge period (i.e., the portion of the charge period when the charge current is off) to complete. The operation of the loop shown by decision block 320 may be accomplished in multiple ways. As an example, if the microcontroller 220 is operating on a global timing loop that approximates the charge period, decision block 320 would wait for a time period that is approximately the global loop time, less the charge pulse duration time, less the time to execute other operations within the global loop. On the other hand, if the battery charging operation 300 is configured to execute at a regularly scheduled interval (i.e., the charge period), decision block 320 is not needed and the battery charging operation 300 would simply exit, since it would be executed again at the next regularly scheduled interval.

FIG. 6 illustrates a global loop that may be used for operating various aspects of the battery-backed power supply 200. In describing the global loop 400, reference will be made to both FIGS. 4 and 6. In general, element numbers on FIG. 4 are in the format 2xx, while element numbers in FIG. 6 are in the format 4xx. The global loop begins with the battery charging operation 300, the details of which are illustrated in FIG. 5. As already stated, if the global loop includes a specific timing loop the battery charge routine would be executed once for each time through the loop. It is not necessarily important where within the loop the battery charge routine is executed. If, on the other hand, the battery charge routine is executed based on a periodic timer, it would execute when the periodic timer expires (e.g., as an interrupt routine) at whatever point the global loop is at when the timer expires.

Operation block 404 indicates other operations that may be performed as part of the global loop. These operations need not be described herein because they are not relevant to aspects of the present invention. Furthermore, it is not necessarily important where these operations occur within the global loop.

Decision block 406 tests the missing battery flag that may have been set in the battery charging routine. If the missing battery flag is set, operation continues at operation block 424. If the missing battery flag is not set, decision block 412 tests to see if an AC voltage is present. This action is performed by the microcontroller 220 reading the input voltage signal 232 generated by the input monitor's 230 representation of the voltage of the AC input 205. If there is no AC voltage present, control transfers to operation block 420.

If AC voltage is present, operation block 414 disconnects the power supply, which is accomplished by the microcontroller 220 controlling a signal to open the supply switch S1. With the supply switch S1 open, the output voltage can be properly tested with no other circuitry intervening and possibly modifying the state of the DC output 212.

Operation block 416 measures the power supply output, which is accomplished by the microcontroller 220 reading the supply voltage signal 242 generated by the supply monitor's 240 representation of the voltage of the DC output 212.

Decision block 418 tests to see if the power supply is functioning properly, which could be, for example, a test to see that the sampled supply voltage signal 242 is within predetermined boundaries for the settings and type of power converter 210 in use. If the power supply is not functioning properly, operation block 420 sets one or more power supply problem flags. For example, these flags may indicate lack of AC input 205, lack of DC output 212, or combination thereof. If the power supply is functioning properly, operation block 422 reconnects the power supply by the microcontroller 220 controlling a signal to close the supply switch S1.

Operation block 424 measures the temperature within the power supply by the microcontroller 220 sampling a signal from the temperature sensor 280. Based on decision block 426, if the temperature is too high, operation block 428 turns the fan 290 on. If the temperature is not too high, operation block 430 turns the fan 290 off. This operation of the temperature sensing may include some hysteresis. In other words, turning the fan 290 on may occur when the temperature exceeds a first temperature threshold, while turning the fan 290 off may occur when the temperature falls below a second temperature threshold.

After controlling the fan 290 through operation block 428 or 430, the global loop 400 returns to the battery charging operation 300 and repeats.

In some embodiments, a temperature sensor may not be used or may not be present. In these embodiments, another approach for controlling the fan 290 may be used.

Figure 7:
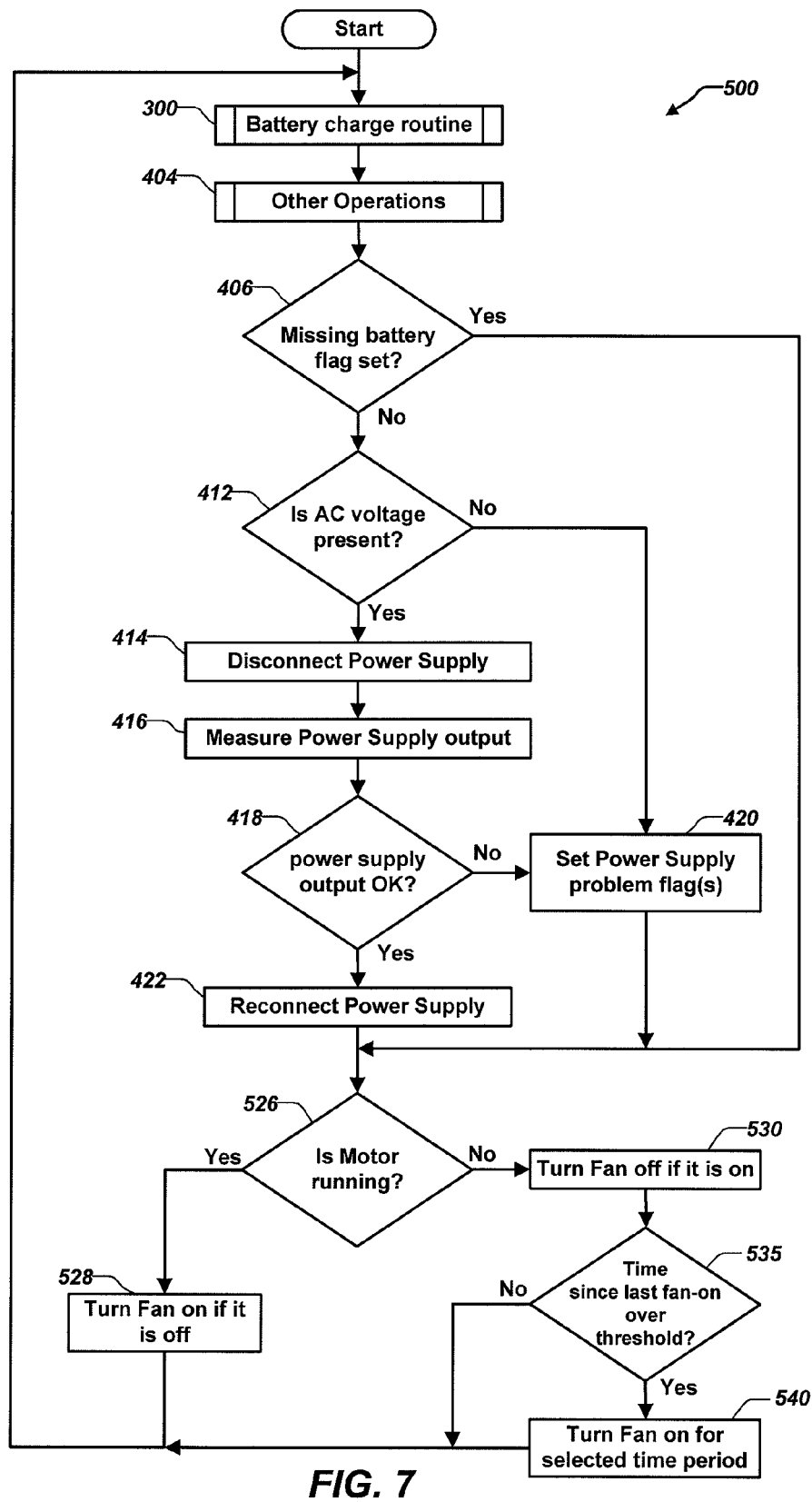
FIG. 7 is a flow diagram illustrating an example of an overall flow for operating various aspects of the battery-backed power supply according to another embodiment of the present invention.

FIG. 7 is a flow diagram illustrating an example of an overall flow for operating various aspects of the battery-backed power supply according to an embodiment of the present invention that may operate without using temperature sensing. As with FIG. 6, in FIG. 7 a global loop may be used for operating various aspects of the battery-backed power supply 200. In describing the global loop 500, reference will be made to FIGS. 4, 6, and 7. In general, element numbers on FIG. 4 are in the format 2xx, while element numbers in FIG. 7 are in the format 4xx when referring to similar operation to those of FIG. 6 and in the format 5xx when referring to operations that may differ from those on FIG. 6.

The global loop 500 begins with the same operations of those on FIG. 6. Namely, operations 300 and 400, decisions 406 and 412, operations 414 and 416, decision 418, and operations 420 and 422. Therefore, a description of these operations and the flow of the global loop 500 related to these operations is not repeated here.

In decision block 526, the process test to see if the motor 122 is running. If so, operation block 528 turns the fan 290 on if it is not already on. After operation block 528, the process goes back to operation 300 to repeat the global loop 500. If the motor 122 is not running, operation block 530 turns the fan 290 off if it is on.

Decision block 535 tests to see if the fan 290 has been off for a predetermined long period of time. If not, the process goes back to operation 300 to repeat the global loop 500. If the fan 290 has been off for the predetermined time, operation block 540 turns the fan on for a short predetermined time. Both the long period of time that the fan 290 is off and the short period time that the fan 290 is on may be selectable and determinable by the controller 220 or the controller 220 in cooperation with user input. As one non-limiting example, if the fan 290 has been off for an hour, it may be turned on for a minute. Of course, other time periods may be used depending on parameters such as heat generation by the system and temperatures at which the system may be operated under.

After operation block 530, the process goes back to operation 300 to repeat the global loop 500.

Although the present invention has been described with reference to particular embodiments, the present invention is not limited to these described embodiments. Rather, the present invention is limited only by the appended claims, which include within their scope equivalent devices and methods that operate according to the principles of the present invention as described.

What is claimed is:

1. A method of providing battery-backed power, comprising:
  providing a power converter for generating a direct current (DC) output from an alternating current (AC) input;
  monitoring the DC output for acceptable operation of the power converter in-situ by:
    sensing a charge current between an enabled DC output and a battery output of a battery;
    controlling charging of the battery with a pulse-width modulation operation for selectively coupling the enabled DC output to the battery output; and
    coupling the enabled DC output and the battery output in a logical-or configuration to generate a supply output that provides current from the battery and from the enabled DC output when it is enabled.

2. The method of claim 1, further comprising:
  determining if a motor being supplied by the enabled DC output is operating; and
  enabling a fan configured to cool the power converter if the motor is operating.

3. The method of claim 2, further comprising:
  determining if a first predetermined time period since a last time the motor was operated has been exceeded; and
  operating the fan for a second predetermined time period if the first predetermined time period has been exceeded.

4. The method of claim 1, further comprising:
  selectively decoupling the DC output from the enabled DC output; and
  generating a supply voltage signal corresponding to a voltage of the DC output;
  wherein selectively decoupling the DC output from the enabled DC output further comprises decoupling the enabled DC output and the supply output, sampling the supply voltage signal after the decoupling, and coupling the enabled DC output and the supply output after the sampling.

5. The method of claim 4, further comprising:
  generating an input voltage signal corresponding to a voltage of the AC input; and
  bypassing the acts of sensing, controlling, and coupling f the input voltage signal indicates that the AC input is inactive.

6. The method of claim 1, further comprising:
  generating a battery voltage signal corresponding to a voltage at the battery output; and
  performing the pulse-width modulation operation if the battery voltage signal is below a predetermined battery threshold.

7. The method of claim 6, wherein the pulse-width modulation operation comprises:
  coupling the enabled DC output to the battery output;
  sensing the charge current between the enabled DC output and the battery output;
  calculating a charge-pulse duration correlated to the charge current;
  decoupling the enabled DC output to the battery output after the charge-pulse duration;
  waiting for a charge-cycle duration to complete; and
  repeating the acts of coupling, sensing, calculating, decoupling, and waiting.

8. A battery-backed power supply, comprising:
  a power converter with an alternating current (AC) input and a direct current (DC) output;
  a first diode operably coupled in a forward biased configuration between the DC output and a biased DC output;
  a supply switch operably coupled between the biased DC output and a supply output;
  a battery switch operably coupled between the supply output and a battery-charge signal;
  battery operably coupled between a ground and a battery output;
  a current sensor operably coupled in series between the battery-charge signal and the battery output;
  a second diode operably coupled between the battery output and the supply output; and
  a controller configured for:
    supplying current to the battery through a battery switch controlled with a pulse-width modulation operation.

9. The battery-backed power supply of claim 8, wherein the controller is further configured for:
  determining if a motor being supplied by the supply output is operating; and
  enabling a fan configured to cool the power converter if the motor is operating.

10. The battery-backed power supply of claim 9, wherein the controller is further configured for:
  determining if a first predetermined time period since a last time the motor was operated has been exceeded; and
  operating the fan for a second predetermined time period if the first predetermined time period has been exceeded.

11. The battery-backed power supply of claim 9, further comprising:
  a motor sensor operably coupled to the controller and wherein the controller samples the motor sensor for the determining if the motor is operating.

12. The battery-backed power supply of claim 8, further comprising:
  a battery monitor operably coupled between the battery output and the controller and configured to generate a battery voltage signal corresponding to a voltage at the battery output; and
  wherein the controller is further configured to sample the battery voltage signal and enable the pulse-width modulation operation if the battery voltage signal is below a predetermined. battery threshold.

13. The battery-backed power supply of claim 12, wherein the controller is further configured to control the pulse-width modulation operation by:
  operating the battery switch to couple the supply output to the battery output;
  sensing a charge current from the current sensor;
  calculating a charge-pulse duration correlated to the charge current;
  operating the battery switch to decouple the supply output from the battery output after the charge-pulse duration;
  waiting for a charge-cycle duration to complete; and
  repeating the operations of operating the battery switch to couple, sensing, calculating, operating the battery switch to decouple, and waiting.

14. The battery-backed power supply of claim 8, wherein the controller is further configured for controlling the supply switch to cause a selective coupling between the biased DC output and the supply output.

15. A movable partition system, comprising:
  at least one movable partition;
  a battery-backed power supply, comprising:
    a power converter with an alternating current input and a direct current (DC) output;
    a first diode operably coupled in a forward biased configuration between the DC output and a biased DC output;
    a supply switch configured for selectively coupling the biased DC output to a supply output;
    a battery operably coupled between a ground and a battery output;
    a battery switch configured for selectively coupling the supply output to a battery-charge signal;
    a current sensor operably coupled in series between the battery-charge signal and the battery output;
    a second diode operably coupled between the battery output and the supply output; and
    a controller configured for charging the battery by controlling the battery switch with a pulse-width modulation operation; and
  a movable partition controller operably coupled to the supply output and including a motor configured for displacing the at least one movable partition.

16. The movable partition system of claim 15, wherein the controller is further configured for:
  determining if the motor being supplied by the supply output is operating; and
  enabling a fan configured to cool the power converter if the motor is operating.

17. The movable partition system of claim 16, wherein the controller is further configured for:
  determining if a first predetermined time period since a last time the motor was operated has been exceeded; and
  operating the fan for a second predetermined time period if the first predetermined time period has been exceeded.

18. The movable partition system of claim 16, further comprising:
  a motor sensor operably coupled to the controller and wherein the controller samples the motor sensor for the determining if the motor is operating.

19. The movable partition system of claim 15, further comprising:
  a supply monitor operably coupled between the DC output and the controller and configured to generate a supply voltage signal corresponding to a voltage of the DC output; and
  wherein the controller is further configured for decoupling the biased DC output and the supply output, sampling the supply voltage signal after the decoupling, and coupling the biased DC output and the supply output after the sampling.

20. The movable partition system of claim 19, further comprising:
  an input monitor operably coupled between the AC input and the controller and configured to generate an input voltage signal corresponding to a voltage of the AC input; and
  wherein the controller is further configured to bypass the operations of decoupling, sampling, and coupling if the input voltage signal indicates that the AC input is inactive.

21. The movable partition system of claim 15, wherein the controller is further configured for controlling the supply switch to cause a selective coupling between the biased DC output and the supply output.

* * * * *